(12) United States Patent
Miyahara

(10) Patent No.: US 7,188,829 B2
(45) Date of Patent: Mar. 13, 2007

(54) LIQUID SEALED MOUNT DEVICE

(75) Inventor: Tetsuya Miyahara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/822,659

(22) Filed: Apr. 13, 2004

(65) Prior Publication Data

US 2004/0201151 A1    Oct. 14, 2004

(30) Foreign Application Priority Data

Apr. 14, 2003  (JP)  .......................... P.2003-109427

(51) Int. Cl.
*F16F 5/00* (2006.01)
(52) U.S. Cl. ............................... 267/140.13; 267/140.4
(58) Field of Classification Search .......... 267/140.13, 267/140.11, 140.3, 140.4
See application file for complete search history.

(56) References Cited

U.S. PATENT DOCUMENTS

| | | | | |
|---|---|---|---|---|
| 4,817,925 A | * | 4/1989 | Sprang et al. | ......... 267/140.13 |
| 4,938,463 A | * | 7/1990 | Miyamoto | ............. 267/140.13 |
| 5,704,598 A | * | 1/1998 | Kojima | ................... 267/140.13 |
| 5,782,462 A | * | 7/1998 | Hein et al. | ............. 267/140.13 |
| 2002/0043748 A1 | * | 4/2002 | Meyer | ................... 267/140.11 |

FOREIGN PATENT DOCUMENTS

| | | |
|---|---|---|
| JP | 08-247208 | 9/1996 |
| JP | 09079310 | 3/1997 |
| JP | 09-329180 | 12/1997 |
| JP | 10009331 | 1/1998 |
| JP | 2000-065119 | 3/2000 |
| JP | 2001-050331 | 2/2001 |

* cited by examiner

*Primary Examiner*—Xuan Lan Nguyen
(74) *Attorney, Agent, or Firm*—Arent Fox PLLC

(57) ABSTRACT

A rubber 12 is vulcanized and bonded integrally with an engine side mounting member 11 and a barrel member 14 for caulking and fixing a diaphragm 16. A car body side mounting member 13 is formed by injection molding a resin material on the outer circumference of the rubber 12. A seal is provided between the barrel member 14 and the diaphragm 16 by caulking the peripheral edge part of the diaphragm 16 with the barrel member 14.

9 Claims, 8 Drawing Sheets

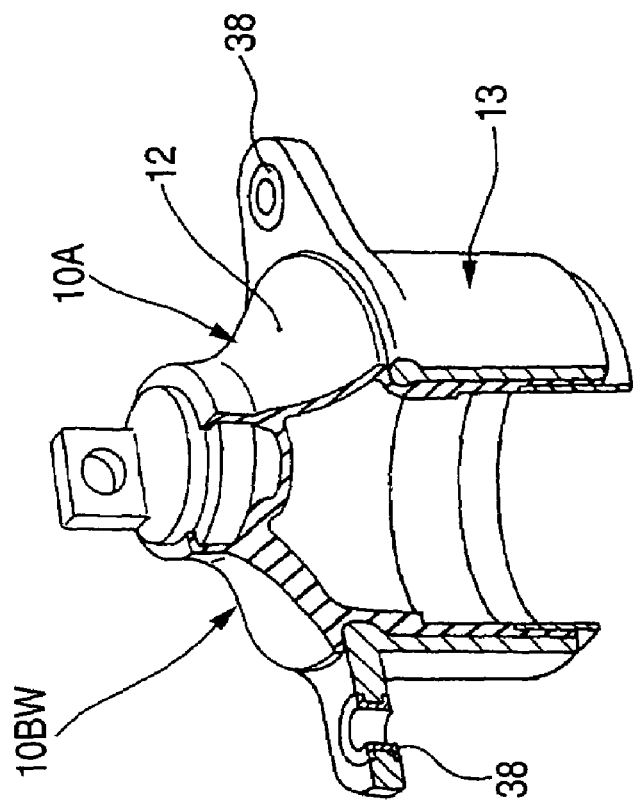
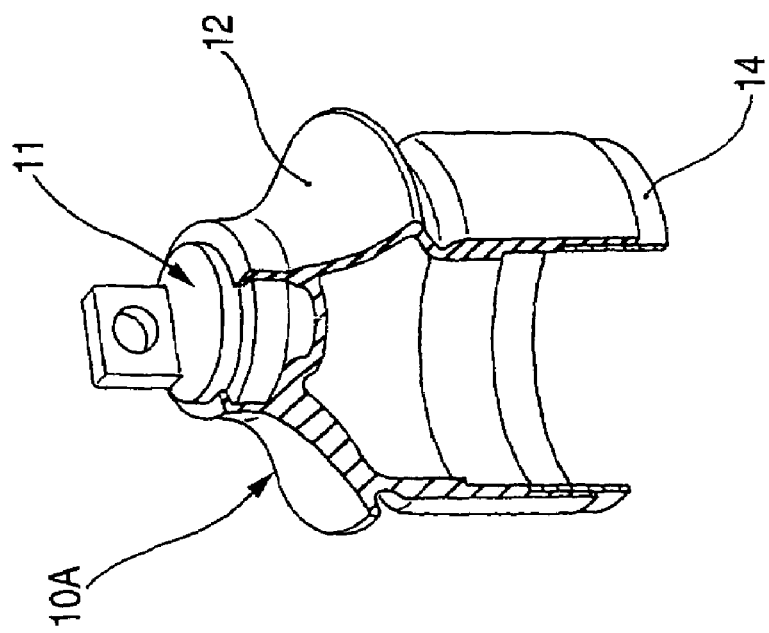

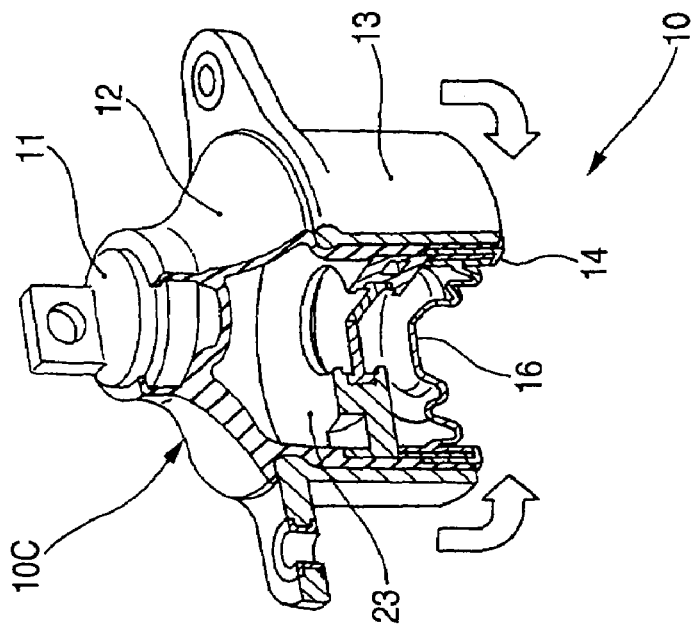
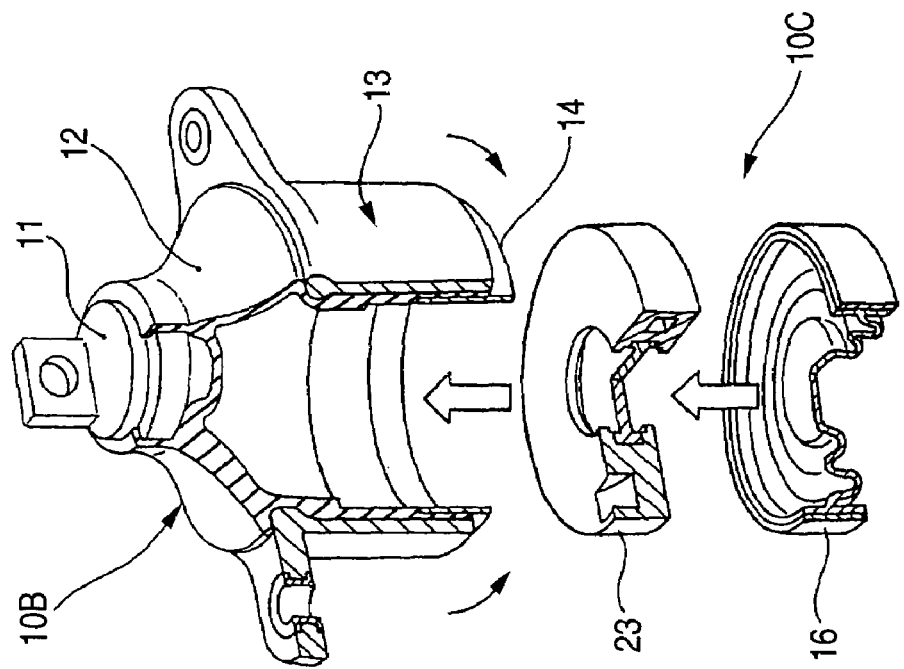
FIG. 3A
FIG. 3B

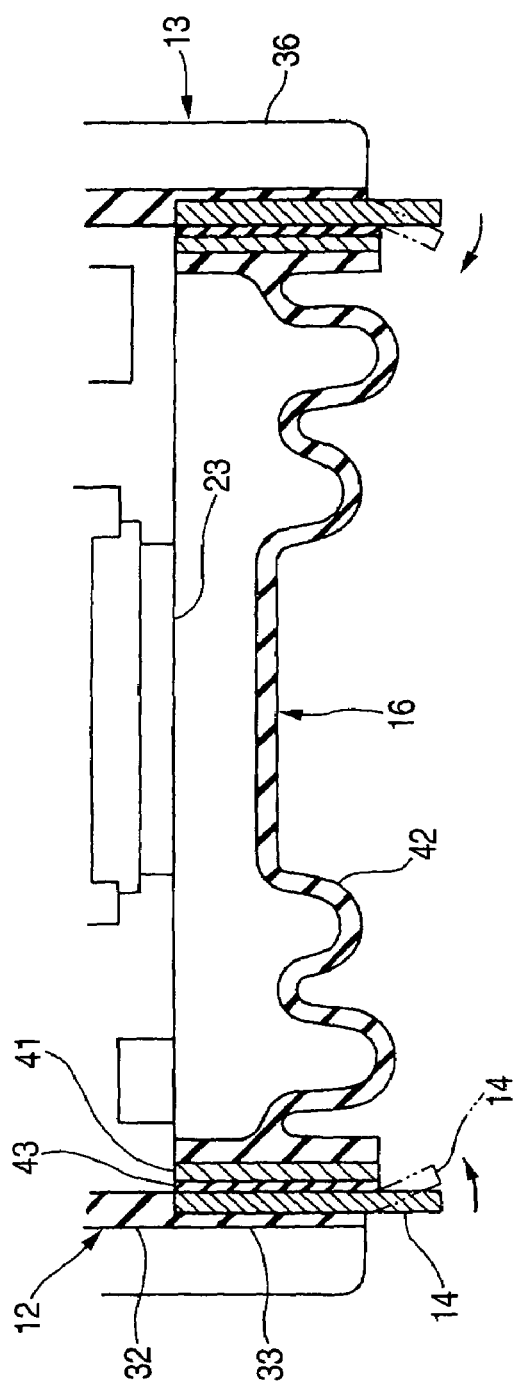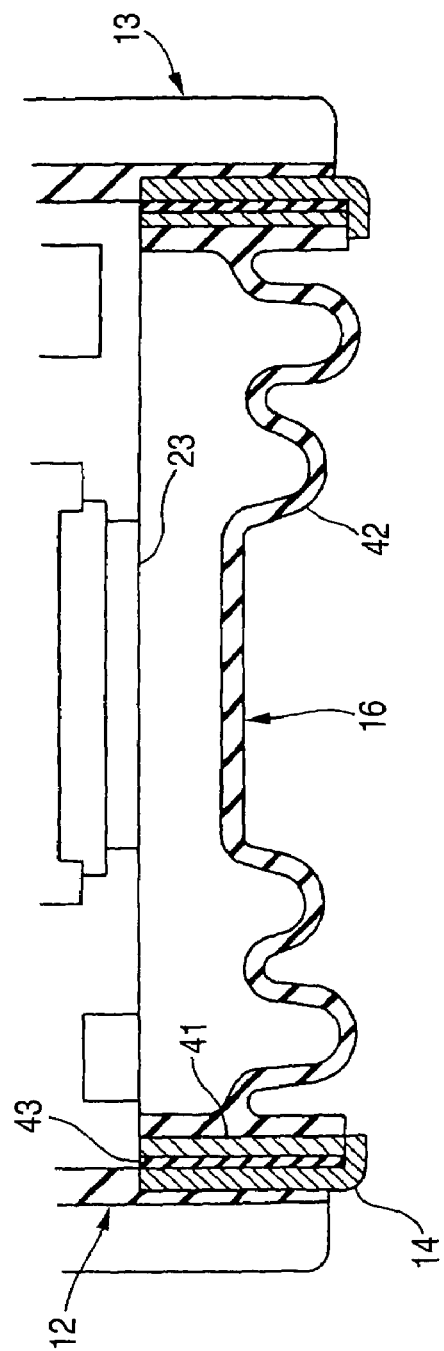
FIG. 5A
FIG. 5B

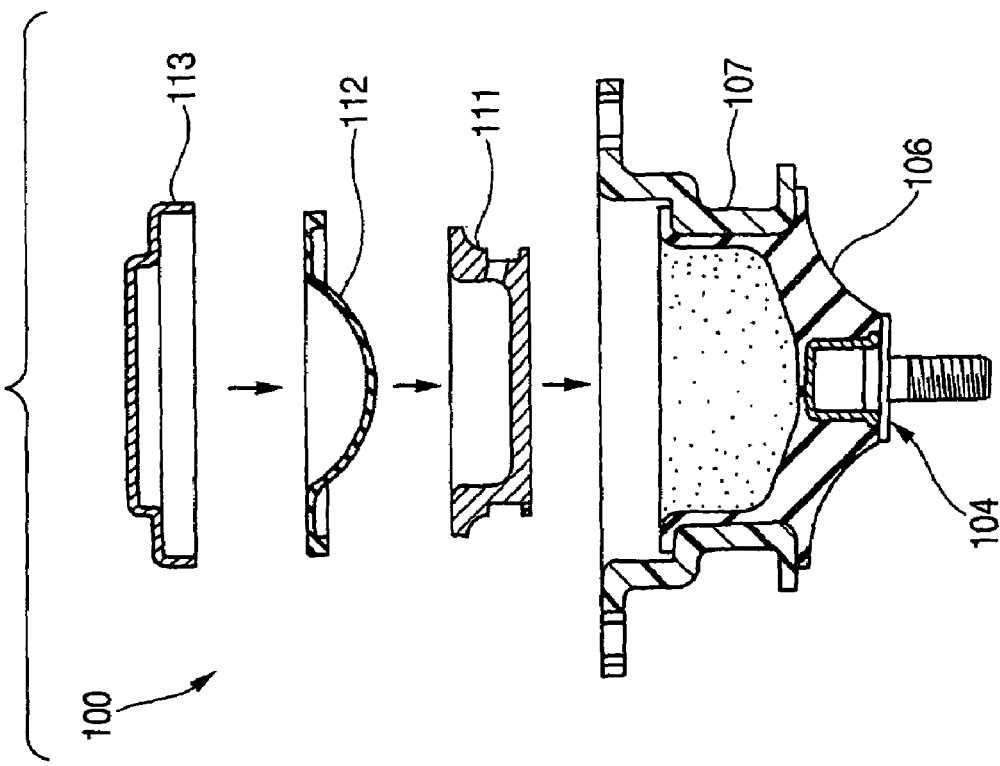
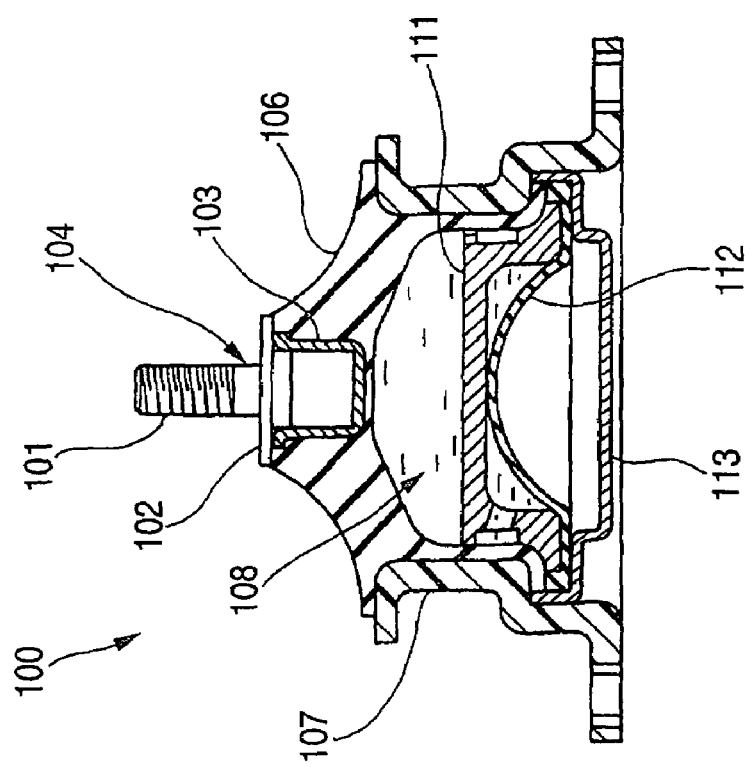
FIG. 7A (Prior Art)
FIG. 7B (Prior Art)

LIQUID SEALED MOUNT DEVICE

BACKGROUND OF THE INVENTION

The present invention relates to a liquid sealed mount device for mounting a power plant on the car body.

A liquid sealed mount device is well known in which a mounting portion made of resin to be mounted on the side of a vibration generating portion such as an engine or a car body is injection molded in a rubber for damping (e.g., refer to patent document 1 and patent document 2).

[Patent Document 1]
JP-A-8-247208 (pages 3 to 5, FIGS. 1 and 3)

[Patent Document 2]
JP-A-2001-50331 (pages 3 and 4, FIGS. 1 and 2)

Referring to FIGS. 7A and 7B, FIGS. 1 and 3 of patent document 1 will be described below. And referring to FIGS. 8A and 7B, FIGS. 1 and 2 of patent document 2 will be described below.

FIGS. 7A and 7B are cross-sectional views showing the conventional liquid sealed mount device (conventional example 1).

In FIG. 7A, a damping device 100 as the liquid sealed mount device comprises a bolt 101 attached on the engine side, a mounting member 104 including a top plate 102 and a tie arm 103, an elastic body 106 that is vulcanized and bonded on the mounting member 104, a support cylinder 107 made of resin and disposed to surround the elastic body 106, a partition member 111 for partitioning a liquid chamber 108 within the elastic body 106 into two chambers, a diaphragm 112 disposed outside the partition member 111, and a cap 113 press fit into an opening portion of the support cylinder 107 to fix the partition member 111 and the diaphragm 112.

Referring to FIG. 7B, a way for manufacturing the damping device 100 will be described.

First of all, the mounting member 104 is placed in a mold for vulcanization to vulcanize the elastic body 106 and bond the elastic body 106 to the mounting member 104.

Moreover, the elastic body 106 and the mounting member 104 are positioned within an injection mold, and molten resin material is injected into the mold, and molded while the support cylinder 107 is bonded with the elastic body 106.

And in the liquid, the partition member 111 and the diaphragm 112 are inserted into the liquid chamber 108 within the elastic body 106 and the support cylinder 107, and lastly the cap 113 is fitted into the inside of the support cylinder 107.

FIGS. 8A and 8B are cross-sectional views showing the conventional liquid sealed mount device (conventional example 2).

In FIG. 8A, a damping device 120 as the liquid sealed mount device comprises a top plate 121 attached on the engine side and a bolt shank 122 attached on the top plate 121, an elastic body 124 that is vulcanized and bonded on a lower face of the top plate 121 and a cylindrical insert fitting 123, an outer cylindrical member 126 disposed on the circumferential side of the insert fitting 123 and the elastic body 124, a partition member 127 and a diaphragm 128 disposed inside the insert fitting 123, and a lid member 131 disposed outside the diaphragm 128 and caulked and fixed by the insert fitting 123.

Referring to FIG. 8B, a way for manufacturing the damping device 120 will be described.

First of all, the top plate 121 and the insert fitting 123 are set within a mold for molding the elastic body.

Then, rubber in molten state is injected into the mold, and the elastic body 124 is vulcanized and bonded to the top plate 121 and the insert fitting 123.

Also, the top plate 121, the insert fitting 123 and the elastic body 124 are set within a mold for molding the outer cylindrical member. Then, resin in molten state is injected into the mold to form the outer cylindrical member 126 around the insert fitting 123.

And the partition member 127, the diaphragm 128 and the lid member 131 are inserted into the insert fitting 123, and the lid member 131 is caulked at the lower end portion of the insert fitting 123.

In FIG. 7, the metallic cap 113 is fitted into the opening portion of the support cylinder 107 made of resin to fix the partition member 111 and the diaphragm 112, and seal the liquid chamber 108. Therefore, the bonding strength between the support cylinder 107 and the cap 113 may be lowered due to a variation in press fit of the cap 113 into the support cylinder 107, a change with the passage of time, or a temperature variation, resulting in a lower sealing ability.

Thus, if the lid member 131 is caulked at the lower end portion of the insert fitting 123, as shown in FIG. 8, the above-mentioned problem is solved. However, in the technique of FIG. 8, the insert fitting 123 is extended from the upper to lower portion of the outer cylindrical member 126, and further to the portion under the outer cylindrical member 126, resulting in an increased weight of the damping device 120 as a whole, whereby there is less effect of reducing the weight by using the outer cylindrical member 126 made of resin in the damping device 120.

If the existent parts are made lighter, in addition to the use of resin, the weight of the damping device or the liquid sealed mount device is further reduced.

SUMMARY OF THE INVENTION

It is an object of the invention to provide a liquid sealed mount device having a lighter weight.

In order to accomplish the above object, the present invention provides a liquid sealed mount device comprising a first mounting member, a second mounting member made of resin, a rubber bridging the gap between the first mounting member and the second mounting member, a diaphragm for forming a liquid chamber sealing the liquid together with the rubber, a partition wall for partitioning the liquid chamber into two chambers, and an orifice provided in the partition wall for communicating two liquid chambers, characterized in that the rubber is vulcanized and bonded integrally with the first mounting member and a metallic barrel member for caulking and fixing the diaphragm, and the second mounting member is formed by injection molding a resin material on the outer circumference of the rubber, in which a seal is provided between the metallic barrel member and the diaphragm by caulking the peripheral edge part of the diaphragm with the metallic barrel member.

Since the second mounting member is formed on the outer circumference of the rubber by injection molding the resin material, the partition wall is supported via the rubber by the second mounting member, and the metallic barrel member is fixed by caulking the diaphragm alone, whereby the metallic barrel member is made smaller and lighter. Also, since the metallic barrel member is vulcanized and bonded integrally with the rubber, the variation in the bonding strength or sealing ability is suppressed as compared with the convention member press fit into the resin.

BRIEF DESCRIPTION OF THE DRAWINGS

FIGS. 2A and 2B are a first action view showing a way for manufacturing the liquid sealed mount device according to the invention.

FIGS. 3A and 3B are a second action view showing a way for manufacturing the liquid sealed mount device according to the invention.

FIGS. 5A and 5B are cross-sectional views for explaining the caulking of a barrel member according to the invention.

FIGS. 7A and 7B are cross-sectional views showing the conventional liquid sealed mount device (conventional example 1).

DETAILED DESCRIPTION OF THE PREFERRED EMBODIMENTS

Figure 1:
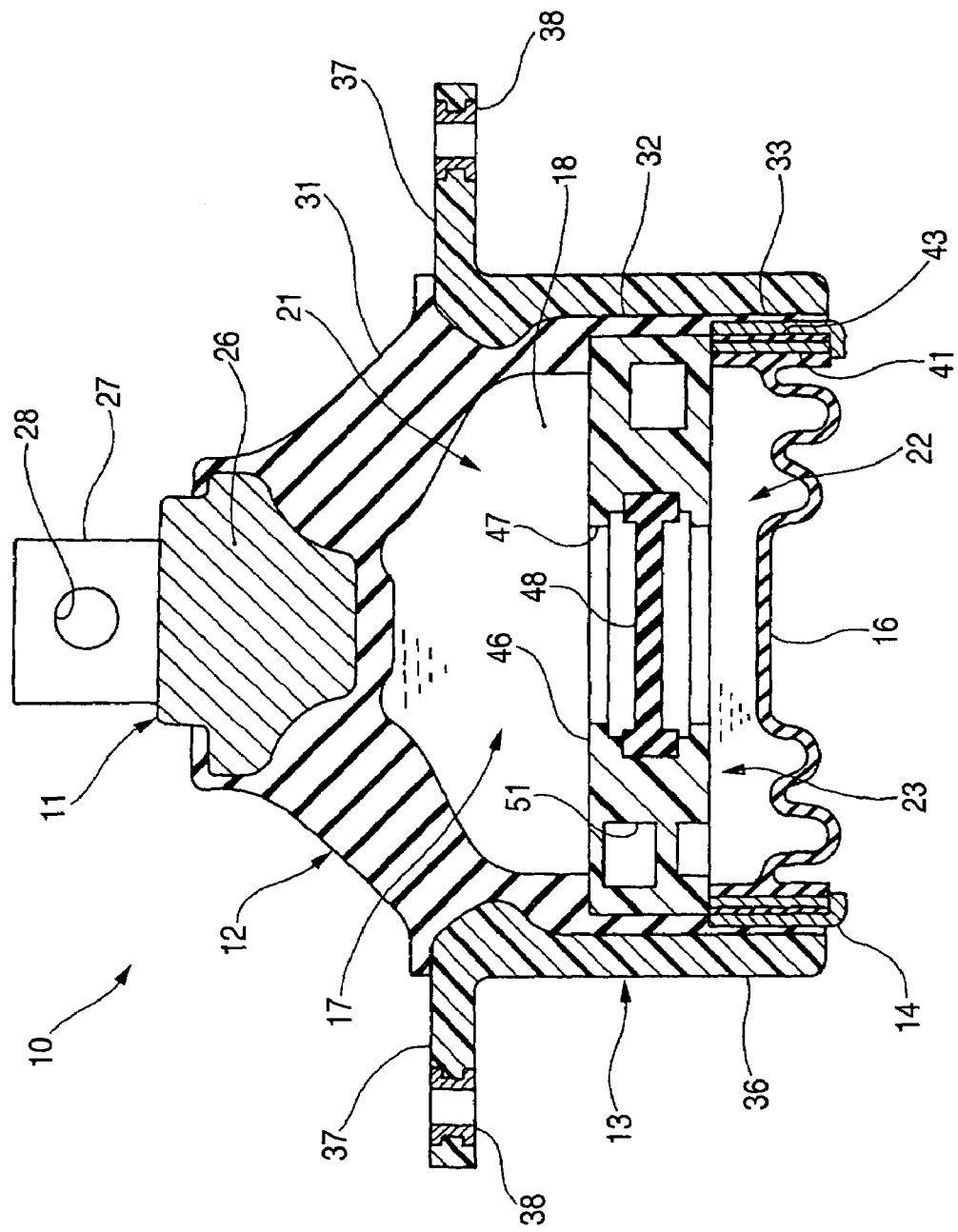
FIG. 1 is a cross-sectional view of a liquid sealed mount device according to the present invention.

The preferred embodiments of the present invention will be described below with reference to the accompanying drawings. Throughout the figures, the same or like parts are designated by the same reference numerals.

FIG. 1 is a cross-sectional view of a liquid sealed mount device according to the invention. The liquid sealed mount device 10 comprises an engine side mounting member 11 made of metal to be mounted on the engine, a cup-like rubber 12 vulcanized and bonded to the engine side mounting member 11, a car body side mounting member 13 made of resin and injection molded in the rubber 12 to be mounted on the car body, a metallic barrel member 14 having the rubber 12 vulcanized and bonded, a diaphragm 16 caulked and fixed by the barrel member 14, a liquid chamber 17 formed by the diaphragm 16 and the rubber 12, a liquid 18 sealed within the liquid chamber 17, and a partition wall 23 for partitioning the liquid chamber 17 into a main liquid chamber. 21 and a secondary liquid chamber 22.

The engine side mounting member 11 comprises a base portion 26 having the rubber 12 vulcanized and bonded, and a plate-like portion 27 stood from the base portion 26 to be mounted on the engine, with a mounting hole 28 opened in the plate-like portion 27.

The rubber 12 comprises a cone-shaped thickened portion 31 serving as the cup bottom, an upper barrel portion 32 provided integrally with a lower portion of the thickened portion 31 and having a larger inner diameter than the thickened portion 31, and a lower barrel portion 33 provided integrally with a lower portion of the upper barrel portion 32 and covering the outside of the barrel member 14.

The car body side mounting member 13 comprises a cylindrical portion 36 covering a lower portion of the rubber 12, the side protruding portions 37, 37 extending sideways from the upper portions of the cylindrical portion 36, and the mounting fittings 38, 38 embedded in the side protruding portions 37, 37.

The diaphragm 16 comprises a cylindrical frame member 41, a diaphragm main body 42 made of rubber and vulcanized and bonded to the inside of the frame member 41, and a rubber covering portion 43 vulcanized and bonded to the frame member 41 to cover the circumferential face of the frame member 41.

The covering portion 43 serves as a seal member between the barrel member 14 and the diaphragm 16, in which the sealing ability with the covering portion 43 is increased by caulking the diaphragm 16 with the barrel member 14.

The partition wall 23 comprises a partition wall main body 46, and a membrane (rubber barrier membrane) 48 provided to close a through hole 47 opened in the center of the partition wall main body 46. The main liquid chamber 21 and the secondary liquid chamber 22 are communicated by forming a spiral orifice 51 in the partition wall main body 46.

The membrane 48 serves to decrease the dynamic spring constant by absorbing a variation in the liquid pressure within the main liquid chamber 21 disposed on the side of the engine side mounting member 11.

Referring to FIGS. 2 to 6, a way for manufacturing the liquid sealed mount device 10 will be described below.

FIGS. 2A and 2B are first action views showing the way for manufacturing the liquid sealed mount device according to the invention.

FIG. 2A shows a state in which the rubber 12 is vulcanized and bonded to the engine side mounting member 11 and the barrel member 14. This molding is a first intermediate molding 10A.

In FIG. 2B, the first intermediate molding 10A as shown in FIG. 2A and the mounting fittings 38, 38 are positioned within an injection mold, and molten resin is injected into the mold to injection mold the car body side mounting member 13 in the rubber 12. Herein, the molding is a second intermediate molding 10B. In FIG. 2A, the barrel member 14 has the rubber 12 vulcanized and bonded, but the barrel member 14 may be joined with resin in this process.

FIGS. 3A and 3B are second action views showing a way for manufacturing the liquid sealed mount device according to the invention.

In FIG. 3A, the second intermediate molding 10B as shown in FIG. 2B is soaked in the liquid, and the partition wall 23 and the diaphragm 16 are inserted in succession from the lower side into the second intermediate molding 10B. Since this operation is performed in the liquid, the liquid is filled in the molding during the operation.

And the barrel member 14 is caulked with a small load not to cause a leakage of liquid from inside the molding. That is, the barrel member 14 is temporarily caulked. Herein, the molding is a third intermediate molding 10C.

In FIG. 3B, the third intermediate molding 10C molded in FIG. 3A is taken out of the liquid, and the barrel member 14 is caulked with a high load. That is, the barrel member is formally caulked. Thereby, the liquid sealed mount device 10 is completed. The process as indicated in FIG. 3B may be made in the liquid after the process as indicated in FIG. 3A.

Figure 4:
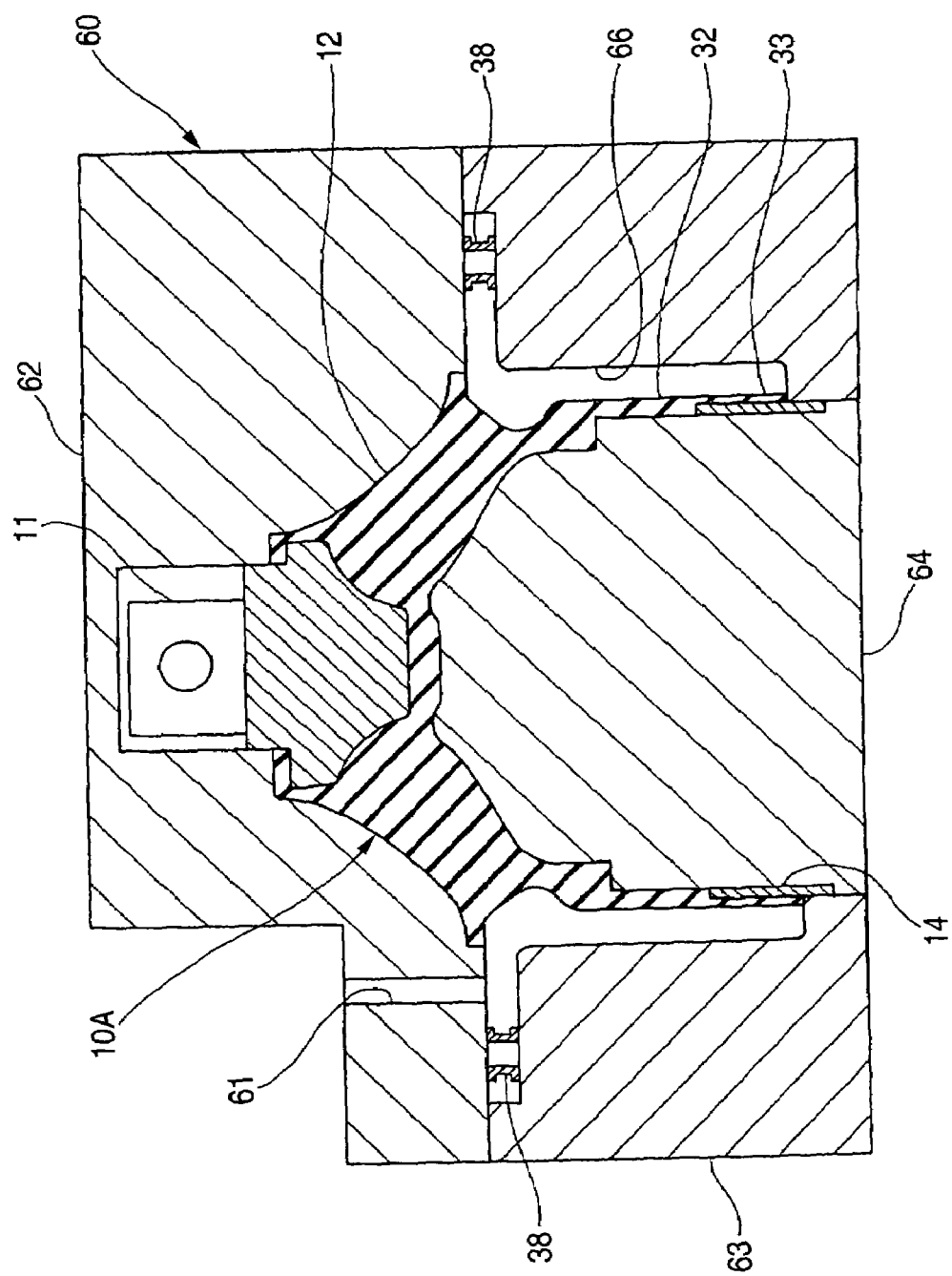
FIG. 4 is a cross-sectional view for explaining the injection molding of a car body side mounting member according to the invention.

FIG. 4 is a cross-sectional view for explaining how to injection mold the car body side mounting member according to the invention, and showing a way for producing the molding as shown in FIG. 2B.

First of all, the first intermediate molding 10A and the mounting fittings 38, 38 are disposed within an injection mold 60. The injection mold 60 includes an upper part 62 with an inlet port 61 opened, a lower part 63 of cylindrical shape, and a middle part 64.

Molten resin is injected through the inlet port 61 into a cavity 66.

And the second intermediate molding 10B (see FIG. 2B) is taken out of the injection mold 60 after resin is solidified.

In FIG. 1, since the cylindrical portion 36 of the car body side mounting member 13 covers the outside of the upper barrel portion 32 and the lower barrel portion 33 for the rubber 12, the partition wall 23 press fit into the upper barrel portion 32 and the diaphragm 16 press fit into the lower barrel portion 33 are securely supported by the cylindrical portion 36.

Accordingly, it is not required that the barrel member 14 is extended upwards to support the partition wall 23, for example. Thereby, it is only necessary to support the diaphragm 16 by reducing the upper and lower sizes of the barrel member 14. Consequently, the barrel member 14 is made smaller and lighter.

FIGS. 5A and 5B are cross-sectional views for explaining how to caulk and fix the barrel member according to the invention.

FIG. 5A shows a state immediately after the diaphragm 16 is press fit into the barrel member 14. To temporarily fix the diaphragm 16 from this state, the barrel member 14 is bent around the entire circumference of the lower end portion as indicated by the imaginary line, whereby the diaphragm 16 is temporarily caulked.

And after temporary caulking, the barrel member 14 is bent almost at right angles around the entire circumference of the lower end portion, whereby the diaphragm 16 is formally caulked, as indicated in FIG. 5B.

The sealing ability between the barrel member 14 and the diaphragm 16 is attained in the resilient covering portion 43 by press fitting the diaphragm 16 into the barrel member 14 at the first step, and enhanced by the covering portion 43 by formally caulking the barrel member 14 at the second step.

Figure 6:
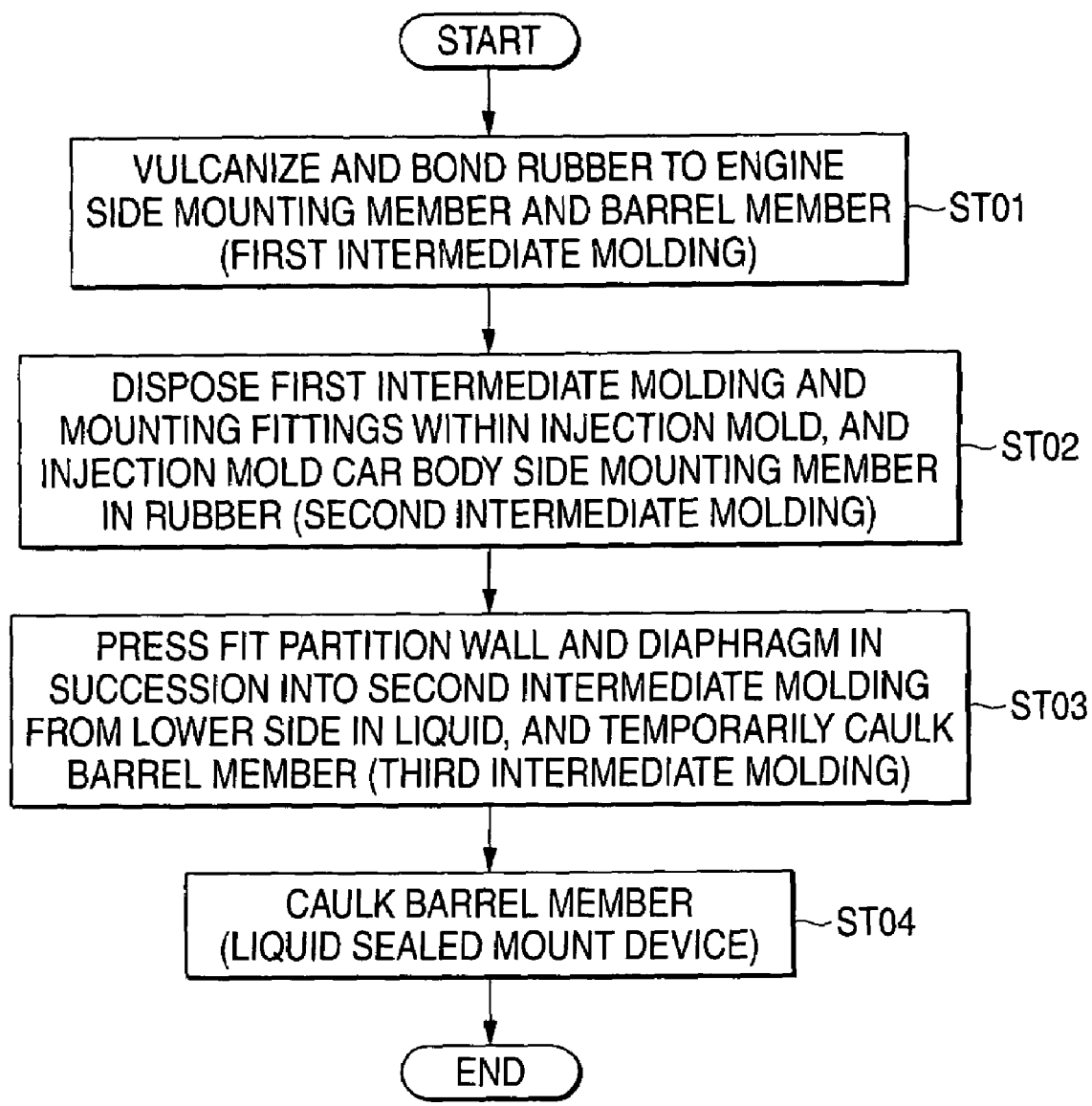
FIG. 6 is a flowchart showing a way for manufacturing the liquid sealed mount device according to the invention.
Figure 8A:
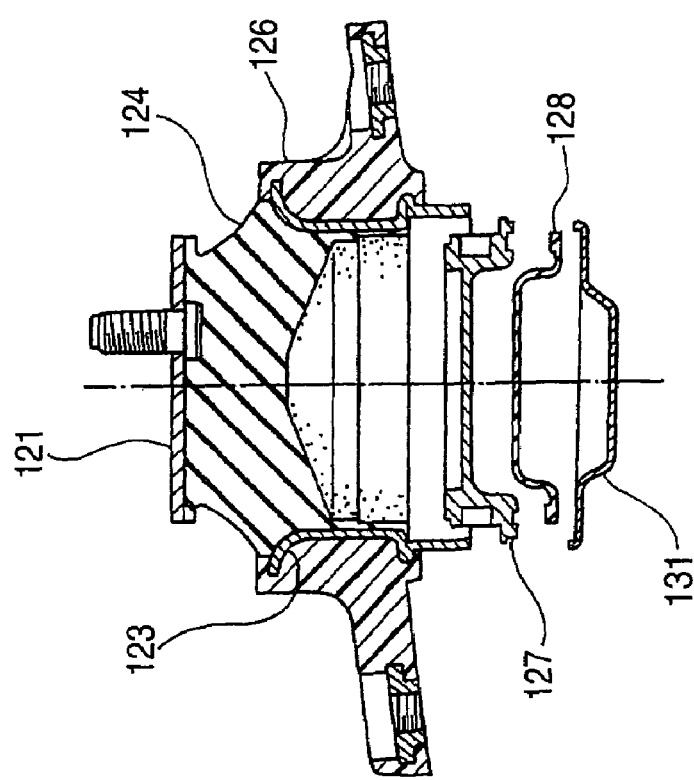
FIGS. 8A and 8B are cross-sectional views showing the conventional liquid sealed mount device (conventional example 2).
Figure 8B:
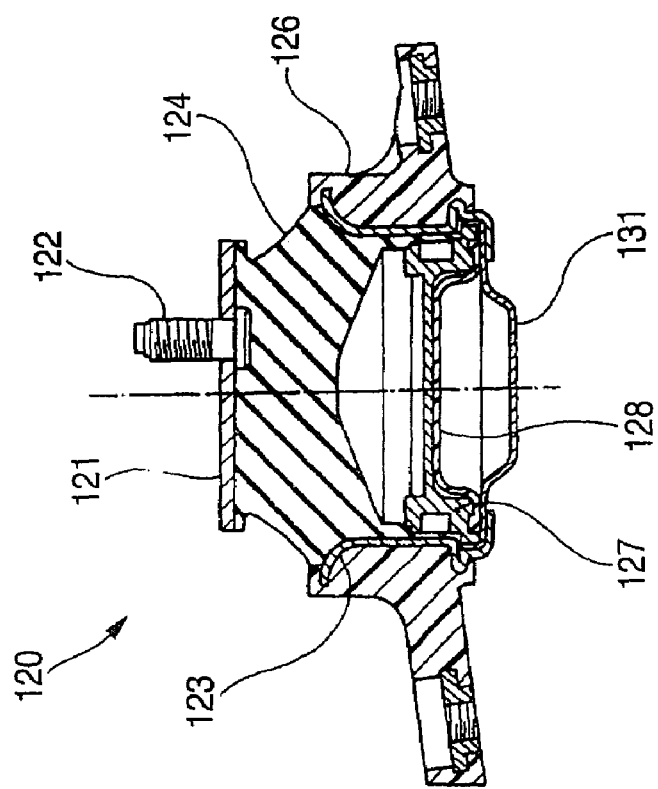

FIG. 6 is a flowchart showing a way for manufacturing the liquid sealed mount device according to the invention. In FIG. 6, STxx denotes the step number.

ST01 . . Vulcanize and bond the rubber to the engine side mounting member and the barrel member (thereby producing the first intermediate molding).

ST02 . . Dispose the first intermediate molding and the mounting fittings within the injection mold, and injection mold the car body side mounting member in the rubber (thereby producing the second intermediate molding).

ST03 . . Press fit the partition wall and the diaphragm in succession into the second intermediate molding from the lower side in the liquid, and temporarily caulk the barrel member (thereby producing the third intermediate molding).

ST04 . . Formally caulk the barrel member (thereby completing the liquid sealed mount device).

As described above in FIG. 1, with the invention, the car body side mounting member 13 is vulcanized and molded in the rubber 12, whereby the partition wall 23 is supported via the rubber 12 by the car body side mounting member 13. And since it is only required to caulk and fix the diaphragm 16 in the barrel member 14, the barrel member 14 is made smaller and lighter.

Though the conventional barrel member has a complex structure, the barrel member 14 has a simple constitution of barrel in this invention, whereby the cost is reduced.

Moreover, in the liquid sealed mount device 10 of the invention, the barrel member 14 is temporarily caulked and then. formally caulked. Therefore, it is possible to confirm a liquid leakage after temporarily caulking the barrel member. If liquid leakage is confirmed at this time, the operation may be interrupted. Accordingly, in the case where the caulking process for the barrel member involves caulking alone, in the invention, the number of wasteful steps is less than when liquid leakage is found after caulking.

Also, the barrel member 14 has the rubber vulcanized and bonded on the circumferential face as described above in FIG. 1. However, the barrel member 14 may have the rubber vulcanized and bonded on both the inner and outer circumferential faces of the barrel member 14, or on the inner circumferential face.

The above constitution of the invention has the following effects.

In the liquid sealed mount device of the invention, the rubber is vulcanized and bonded integrally with the first mounting member and the metallic barrel member for caulking and fixing the diaphragm, and the second mounting member is formed by injection molding a resin material on the outer circumference of the rubber, in which a seal is provided between the metallic barrel member and the diaphragm by caulking the peripheral edge part of the diaphragm with the metallic barrel member. Therefore, the partition wall is supported via the rubber by the second mounting member, and the metallic barrel member is fixed only by caulking the diaphragm alone, whereby the metallic barrel member is made smaller and lighter, and the liquid sealed mount device is made lighter.

Also, since the metallic barrel member is vulcanized and bonded integrally with the rubber, the variation in the bonding strength or sealing ability is suppressed as compared with the convention member press fit into the resin.

What is claimed is:

1. A liquid sealed mount device comprising:
    a first mounting member;
    a second mounting member made of resin;
    an elastic material bridging a gap between the first mounting member and the second mounting member;
    a diaphragm for forming a liquid chamber sealing the liquid together with the elastic material, wherein the diaphragm comprises a frame member, a main body bonded to and entirely covering a first surface of the frame member, and a covering portion bonded to and entirely covering a second surface of the frame member;
    a partition wall for partitioning the liquid chamber into two liquid chambers; and
    an orifice provided in the partition wall for communicating the two liquid chambers,
    wherein the elastic material is vulcanized and bonded integrally with and directly contacts the first mounting member and a metallic barrel member for caulking and fixing the diaphragm,
    wherein the second mounting member is formed by injection molding a resin material on an outer circumference surface of the elastic material, in which a seal is provided between the metallic barrel member and the diaphragm by caulking a peripheral edge part of the diaphragm with the metallic barrel member,
    wherein the covering portion defines a seal member which directly engages the metallic barrel member and the second surface of the frame member, and
    wherein the partition wall is supported by the second mounting member via the elastic material, and caulked and fixed thereto by the metallic barrel member via the frame member from the opening side thereof.

2. The liquid sealed mount device as set forth in claim 1, wherein the elastic material is rubber.

3. The liquid sealed mount device as set forth in claim 1, wherein the elastic material comprises a conical portion, a first barrel portion extending from an open end of the conical portion, and a second barrel portion extending from a free end of the first barrel portion.

4. The liquid sealed mount device as set forth in claim 1, wherein the partition wall comprises a main body encompassing a membrane.

5. The liquid sealed mount device as set forth in claim 4, wherein the membrane of the partition wall closes a through hole defined in the main body of the partition wall and absorbs variations in liquid pressure within one of the two liquid chambers.

6. The liquid sealed mount device as set forth in claim 1, wherein the barrel member is disposed directly between the elastic material and the covering portion of the diaphragm.

7. The liquid sealed mount device as set forth in claim 1, wherein an uppermost surface of the diaphragm abuts a lowermost surface of the partition wall.

8. The liquid sealed mount device as set forth in claim 1, wherein a lowermost surface of the elastic member is coplanar with a lowermost surface of the second mounting member.

9. The liquid sealed mount device as set forth in claim 1, wherein the barrel member includes a flange extending radially inward and abuttingly contacting a lowermost surface of the covering portion.

\* \* \* \* \*